United States Patent [19]
Nakajima et al.

[11] Patent Number: 5,915,034
[45] Date of Patent: Jun. 22, 1999

[54] PATTERN COLLATION APPARATUS BASED ON SPATIAL FREQUENCY CHARACTERISTICS

[75] Inventors: Hiroshi Nakajima; Koji Kobayashi, both of Kanagawa; Masayuki Kawamata, Miyagi; Takafumi Aoki, Miyagi; Tatsuo Higuchi, Miyagi, all of Japan

[73] Assignee: Yamatake-Honeywell, Co., Ltd., Tokyo, Japan

[21] Appl. No.: 08/638,430

[22] Filed: Apr. 26, 1996

[30] Foreign Application Priority Data

May 2, 1995 [JP] Japan .................................... 7-108526

[51] Int. Cl.⁶ .............................. G06K 9/62; G06K 9/82
[52] U.S. Cl. .......................... 382/124; 382/210; 382/278; 382/280
[58] Field of Search ..................................... 382/210, 124, 382/278, 280, 211; 356/71; 396/15; 364/728.03, 822; 359/561

[56] References Cited

U.S. PATENT DOCUMENTS

| | | | |
|---|---|---|---|
| 4,513,441 | 4/1985 | Henshaw | 382/280 |
| 4,588,260 | 5/1986 | Horner | 359/561 |
| 5,040,140 | 8/1991 | Horner | 364/822 |
| 5,050,220 | 9/1991 | Marsh et al. | 382/124 |
| 5,175,775 | 12/1992 | Iwaki et al. | 382/211 |
| 5,189,513 | 2/1993 | Sekine et al. | 382/107 |
| 5,214,534 | 5/1993 | Kallman et al. | 359/561 |
| 5,276,636 | 1/1994 | Cohn | 364/822 |
| 5,604,634 | 2/1997 | Khoury et al. | 359/561 |
| 5,619,596 | 4/1997 | Iwaki et al. | 382/278 |

OTHER PUBLICATIONS

Applied Optics, vol. 31, No. 8, Mar. 10, 1992, pp. 1126–1137. Kotzer et al., "Phase Extraction Pattern Recognition".

Optical Engineering, vol. 30, No. 12, Dec. 1, 1991, pp. 1958–1961, Fieldman et al., "Optical Fingerprint Identification by Binary Joint Transformation Correlation".

Proceedings of the IEEE, vol. 77, No. 10, Oct. 1, 1989, pp. 1511–1526, Flannery & Horner, "Fourier Optical Signal Processors".

Applied Optics, vol. 33, No. 14, May 1994, Washington, VA, pp. 3070–3075, Carmicer et al., "Controlled–Intensity Detection Peaks in a Binary Joint Transform Correlator".

"Introduction to Computer Image Processing" Japan Industrial Technology center pp. 44–45, Jun., 1990.

"Fingerprint Identification Algorithm Using 2–D DFT" Savemation Review pp. 2–7, Feb., 1995.

"Fingerprint Identification System Using Liquid Crystal Spatial Light Modulators for Phase Modulation", The Institute of Electronics, and Communication Engineers, Proceedings of the 1993 IEICE Fall Conference D–287, Sep. 1993.

*Primary Examiner*—Jon Chang
*Attorney, Agent, or Firm*—Blakely Sokoloff; Taylor & Zafman

[57] ABSTRACT

In a pattern processing apparatus, a registration data preparation unit performs two-dimensional discrete Fourier transform of image data of a registration pattern to prepare registration Fourier image data. A collation data preparation unit performs two-dimensional discrete Fourier transform of image data of a collation pattern to prepare collation Fourier image data. A data synthesizing unit synthesizes the registration Fourier image data with the collation Fourier image data, both of which consist of phase and amplitude information, to output first synthesized Fourier image data. An image processing unit performs Fourier transform of the first synthesized Fourier image data to output second synthesized Fourier image data representing intensities of correlation components. A pattern collation unit collates the registration pattern with the collation pattern on the basis of the intensities of the correlation components of pixels in a correlation component area set in the second synthesized Fourier image data. An amplitude suppressing processing unit performs amplitude suppressing processing of one of the registration/collation Fourier image data and the first synthesized Fourier image data to extract only the phase information.

18 Claims, 12 Drawing Sheets

FIG. 6

| 85 | 95 | 20 | 59 | 45 | 56 | 33 | 14 | 4 | 42 | 25 | 22 | 35 | 19 | 9 |
| 153 | 26 | 71 | 142 | 23 | 21 | 59 | 82 | 13 | 110 | 12 | 27 | 39 | 50 | 26 |
| 32 | 117 | 153 | 18 | 28 | 27 | 0 | 96 | 38 | 66 | 2 | 28 | 57 | 62 | 24 |
| 85 | 135 | 14 | 42 | 54 | 7 | 37 | 46 | 5 | 50 | 96 | 28 | 44 | 7 | 38 |
| 133 | 5 | 13 | 69 | 37 | 21 | 42 | 75 | 86 | 45 | 42 | 5 | 18 | 90 | 47 |
| 100 | 9 | 56 | 20 | 1 | 61 | 4 | 44 | 110 | 48 | 27 | 38 | 42 | 18 | 119 |
| 122 | 117 | 89 | 50 | 32 | 126 | 30 | 31 | 38 | 31 | 62 | 54 | 45 | 8 | 9 |
| 133 | 90 | 27 | 24 | 46 | 142 | 12 | 9 | 99 | 28 | 70 | 34 | 31 | 51 | 16 |
| 50 | 91 | 184 | 97 | 54 | 10 | 4 | 44 | 43 | 88 | 100 | 33 | 17 | 72 | 72 |
| 198 | 150 | 2 | 18 | 24 | 2 | 253 | 107 | 153 | 11 | 59 | 66 | 27 | 137 | 50 |
| ⓘ434 | 183 | 25 | 206 | 202 | 12 | ⓘ386 | 79 | 18 | 296 | 204 | 44 | 21 | 158 | 96 |
| 198 | 106 | 86 | ⓘ489 | 154 | ⓘ327 | ⓘ632 | 206 | 241 | 245 | 153 | 66 | 46 | 38 | 9 |
| 50 | 43 | 108 | ⓘ322 | ⓘ297 | 111 | ⓘ950 | 123 | 276 | 64 | 21 | 39 | 88 | 33 | 2 |
| 133 | 66 | 132 | 274 | 9 | 17 | 159 | 272 | 182 | 54 | 52 | 67 | 44 | 146 | 7 |
| 122 | 142 | 31 | 80 | 102 | 120 | 189 | 36 | 64 | 35 | 44 | 81 | 49 | 9 | 38 |
| 100 | 0 | 21 | 31 | 162 | 215 | 12 | 0 | 31 | 78 | 19 | 114 | 38 | 79 | 1 |
| 133 | 258 | 50 | 111 | 32 | 65 | 16 | 51 | 3 | 22 | 23 | 34 | 16 | 89 | 6 |
| 86 | 82 | 60 | 120 | 12 | 27 | 37 | 17 | 57 | 5 | 22 | 69 | 47 | 24 | 37 |
| 32 | 82 | 31 | 82 | 129 | 38 | 22 | 48 | 50 | 27 | 42 | 22 | 20 | 7 | 18 |
| 153 | 80 | 10 | 3 | 75 | 92 | 10 | 96 | 35 | 28 | 15 | 72 | 42 | 19 | 74 |
| 5 | 79 | 41 | 38 | 44 | 36 | 6 | 37 | 23 | 33 | 47 | 86 | 67 | 63 | 10 |
| 38 | 17 | 3 | 7 | 5 | 6 | 30 | 14 | 41 | 30 | 33 | 32 | 47 | 52 | 31 |
| 77 | 32 | 28 | 34 | 34 | 34 | 87 | 0 | 17 | 65 | 52 | 35 | 26 | 84 | 45 |
| 23 | 49 | 26 | 20 | 0 | 14 | 11 | 96 | 11 | 21 | 45 | 135 | 55 | 2 | 77 |

5,915,034

PATTERN COLLATION APPARATUS BASED ON SPATIAL FREQUENCY CHARACTERISTICS

BACKGROUND OF THE INVENTION

The present invention relates to a pattern collation apparatus for performing collation of a pattern such as a fingerprint on the basis of spatial frequency characteristics.

In recent years, fingerprint collation apparatuses are replacing conventional ID numbers or ID cards in fields where personal recognition is required in, e.g., entrance management for computer rooms or important machine rooms, or access management for computer terminals or teller terminals of banks.

FIG. 12 shows an experimental system shown in Toyoda et al., "Fingerprint Identification System using Liquid Crystal Spatial Light Modulators for Phase Modulation", The INSTITUTE OF ELECTRONICS, INFORMATION AND COMMUNICATION ENGINEERS, PROCEEDINGS OF THE 1993 IEICE FALL CONFERENCE D-287, September 1993 (Reference 1). Referring to FIG. 12, reference numeral 1 denotes a CRT (Cathode Ray Tube) display; 2-1 and 2-2, phase modulation type liquid crystal spatial light modulators; 3, a lens; 4-1 and 4-2, Fourier lenses; 5-1 to 5-3, half mirrors; 6, a total reflecting mirror; and 7, a photodiode. Reference symbol L denotes a laser beam.

In this system, the fingerprint of a finger to be registered (registration fingerprint) is photographed by a CCD camera (not shown) and stored. The fingerprint to be collated (collation fingerprint) is photographed by the CCD camera. As shown in FIG. 13A, the image of the registration fingerprint and the image of the collation fingerprint are simultaneously placed on the left and right sides to form one input image, and this input image is displayed on the screen of the CRT display 1. The input image displayed on the screen of the CRT display 1 causes interference to generate a vertical fringe pattern after transmission through the phase modulation type liquid crystal spatial light modulator 2-1 and the Fourier transform lens 4-1.

With this processing, the spatial frequency is separated by the first-time optical Fourier transform, so that the input image shown in FIG. 13A becomes a Fourier image as shown in FIG. 13B. In this Fourier image, the low-frequency components of the spatial frequency appear at the central portion. When this Fourier image passes through the phase modulation type liquid crystal spatial light modulator 2-2 and the Fourier transform lens 4-2, second-time optical Fourier transform is performed. With this processing, the Fourier image shown in FIG. 13B becomes a Fourier image as shown in FIG. 13C. In this Fourier image, the low-frequency components of the spatial frequency appear at the central portion while the high-frequency components appear on the left and right sides.

If the registration fingerprint matches the collation fingerprint, the light intensities of left and right correlation component areas S1 and S2 in FIG. 13C increase. The photodiode 7 is arranged such that its light-receiving surface is positioned in, e.g., the left correlation component area S1 of the left and right correlation component areas S1 and S2. Therefore, when the light intensity of the correlation component area S1, which is detected by the photodiode 7, is larger than a predetermined threshold value, i.e., when a correlation peak appears, it can be determined that the registration fingerprint matches the collation fingerprint.

However, according to such a conventional fingerprint collation method, the light intensity of the entire correlation component area S1 is detected by the photodiode 7, i.e., the average value of light intensities in the correlation component area S1 is detected. For this reason, the S/N ratio degrades due to the influence of pixels with low light intensities in pixels constituting the correlation component area S1, resulting in a deterioration in collation accuracy. In addition, the collation accuracy also deteriorates due to the illuminance difference in sampling between the registration fingerprint and the collation fingerprint. More specifically, if the illuminance difference in sampling between the registration fingerprint and the collation fingerprint is large, the fingerprint cannot be recognized as that of a person in question.

When the position of the collation fingerprint shifts with respect to the registration fingerprint, the position where the correlation peak appears also shifts. The conventional fingerprint collation method sometimes cannot cope with such a shift because the photodiode 7 is used to detect the correlation peak. More specifically, when the area of the photodiode is decreased to increase the S/N ratio, the positional shift of the correlation peak cannot be solved. When the area of the photodiode is increased to cope with the positional shift, the S/N ratio decreases. Therefore, an increase in S/N ratio is inconsistent with solution to the positional shift.

When a CCD (Charge Coupled Device) element is used in place of the photodiode 7, and the light-receiving area is increased, the above-described degradation in collation accuracy or the positional shift of the collation fingerprint can be coped with this arrangement. However, a CCD is much more expensive than a photodiode, so that the cost of the entire apparatus largely increases.

The conventional fingerprint collation method requires phase modulation type liquid crystal spatial light modulators and Fourier transform lenses. From the viewpoint of accuracy, it is difficult to manufacture an optical system by combining these parts. In addition, since these parts themselves are expensive, the system inevitably becomes expensive.

SUMMARY OF THE INVENTION

It is an object of the present invention to provide a pattern collation apparatus with a high collation accuracy.

It is another object of the present invention to provide a pattern collation apparatus capable of coping with the positional shift of a collation pattern.

It is still another object of the present invention to provide an inexpensive pattern collation apparatus.

In order to achieve the above objects, according to the present invention, there is provided a pattern processing apparatus comprising registration data preparation means for performing two-dimensional discrete Fourier transform of image data of a registration pattern to prepare registration Fourier image data consisting of phase information and amplitude information, collation data preparation means for performing two-dimensional discrete Fourier transform of image data of a collation pattern to prepare collation Fourier image data consisting of phase information and amplitude information, data synthesizing means for synthesizing the registration Fourier image data prepared by the registration data preparation means with the collation Fourier image data prepared by the collation data preparation means to output first synthesized Fourier image data, image processing means for performing Fourier transform of the first synthesized Fourier image data from the data synthesizing means to output second synthesized Fourier image data representing intensities of correlation components, pattern collation means for collating the registration pattern with the collation pattern on the basis of the intensities of the correlation components of pixels in a correlation component area set in the second synthesized Fourier image data from the image processing means, and amplitude suppressing processing means for performing amplitude suppressing processing of one of the registration/collation Fourier image data and the first synthesized Fourier image data to extract only the phase information.

BRIEF DESCRIPTION OF THE DRAWINGS

FIG. 6 is a view showing numerical data of intensities of correlation components of pixels in part of a correlation component area;

DESCRIPTION OF THE PREFERRED EMBODIMENT

Figure 2:
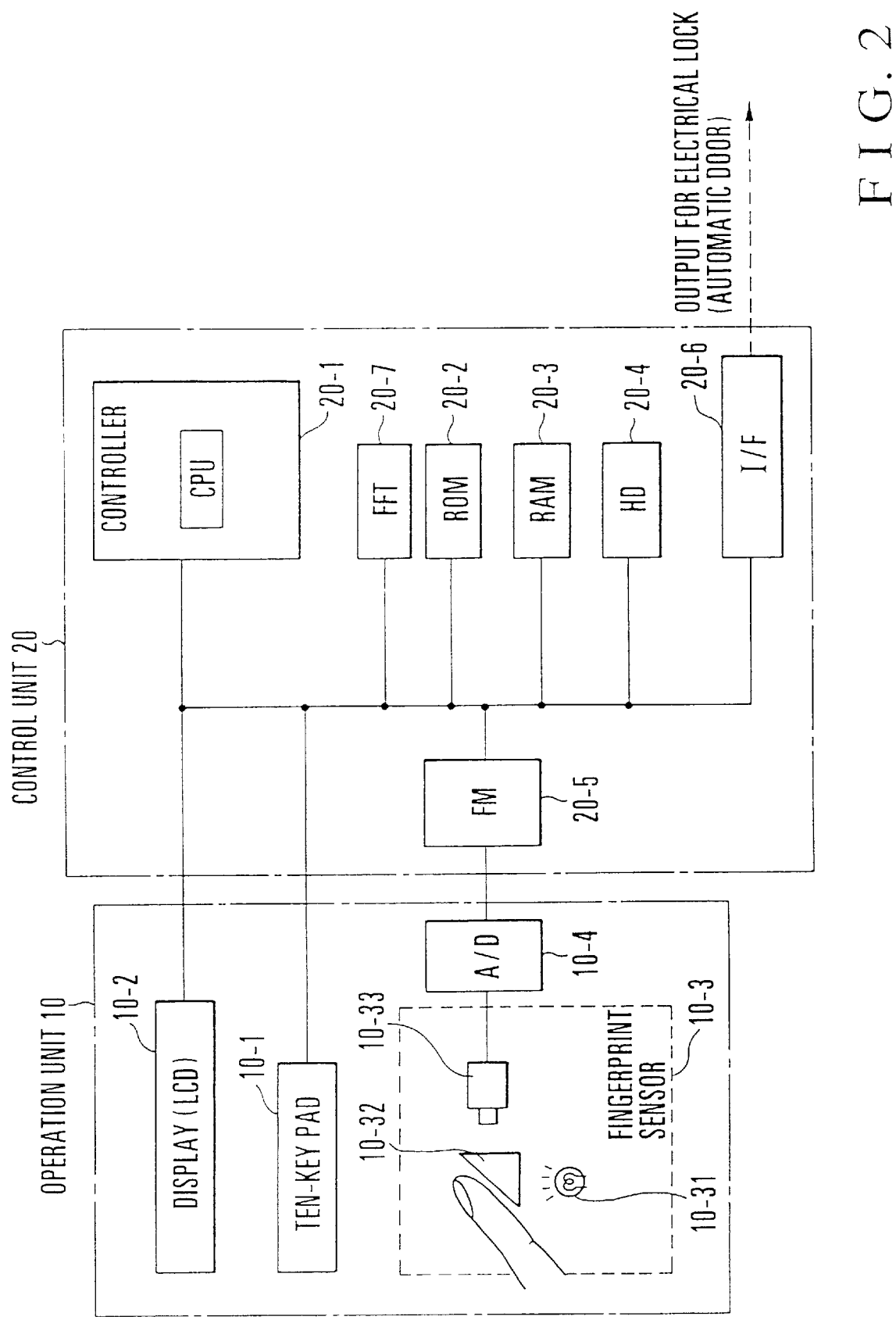
FIG. 2 is a block diagram showing a fingerprint collation apparatus according to an embodiment of the present invention.

The present invention will be described below in detail with reference to an embodiment. FIG. 2 shows a fingerprint collation apparatus according to an embodiment of the present invention. Referring to FIG. 2, reference numeral 10 denotes an operation unit; and 20, a control unit. The operation unit 10 has a ten-key pad 10-1, a display (LCD) 10-2, and a fingerprint sensor 10-3. The fingerprint sensor 10-3 comprises a light source 10-31, a prism 10-32, and a CCD camera 10-33. The control unit 20 comprises a controller 20-1 having a CPU (Central Processing Unit), a ROM (Read Only Memory) 20-2, a RAM (Random Access Memory) 20-3, a hard disk (HD) 20-4, a frame memory (FM) 20-5, an external connection unit (I/F) 20-6, and a Fourier transform unit (FFT) 20-7. A recessed portion molded after the shape of a finger is formed in the surface of the prism 10-32 to prevent a large positional shift of a registration fingerprint or a collation fingerprint with respect to the CCD camera 10-33. A registration program and a collation program are stored in the ROM 20-2.

Figure 10:
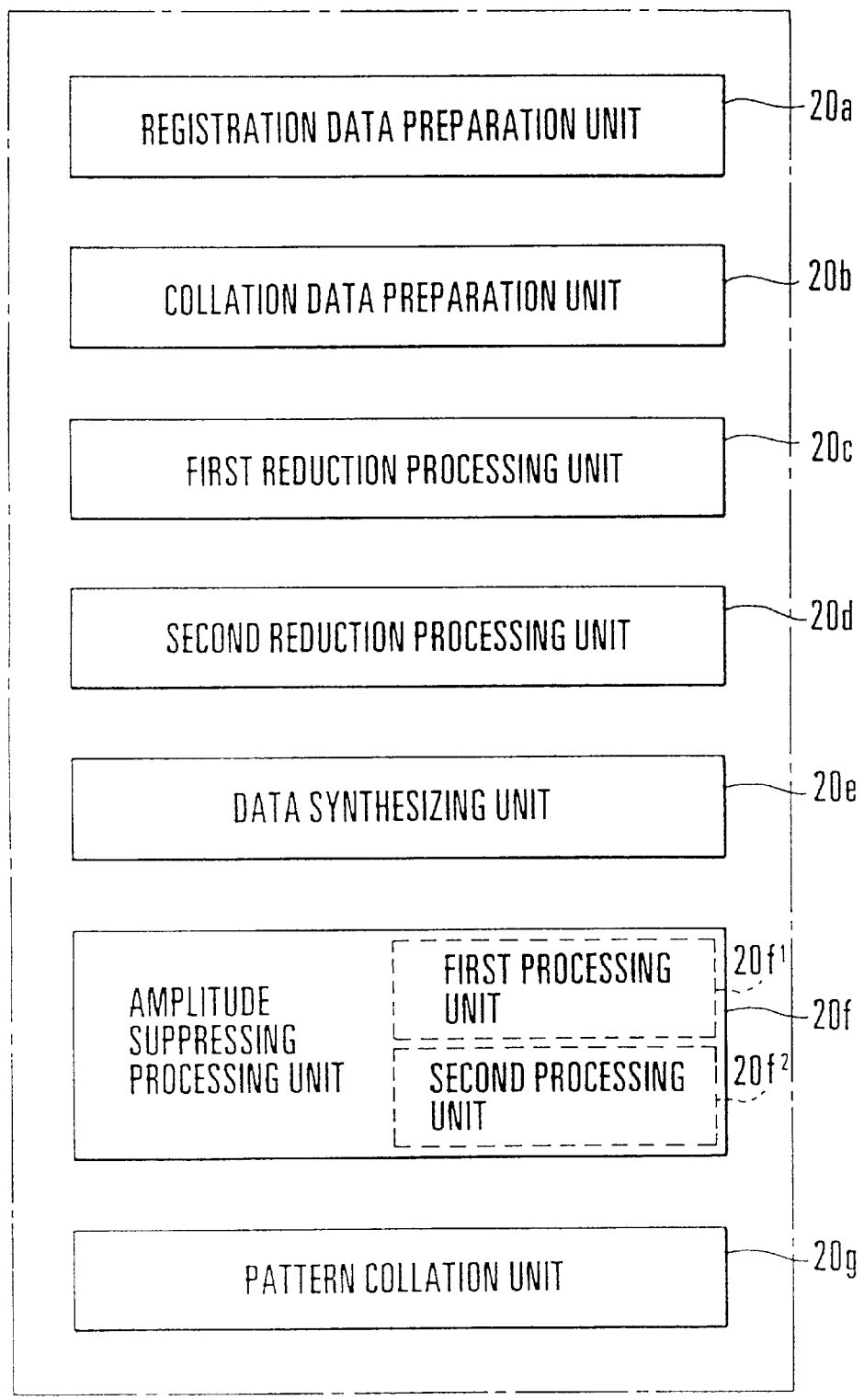
FIG. 10 is a functional block diagram of a controller shown in FIG. 2.
Figure 11A:
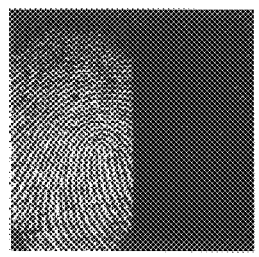
FIGS. 11A to 11H are views of images in fingerprint collation processes for the collation fingerprint of a third party in correspondence with FIGS. 1A to 1H.
Figure 11B:
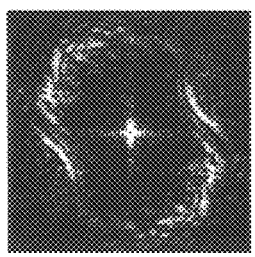
Figure 11C:
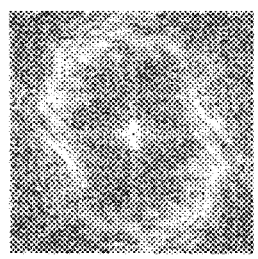
Figure 11D:
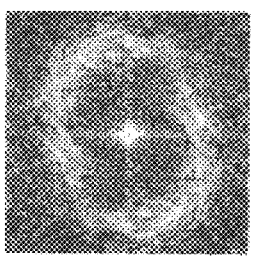
Figure 11E:
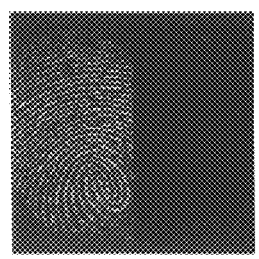
Figure 11F:
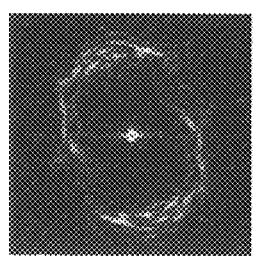
Figure 11G:
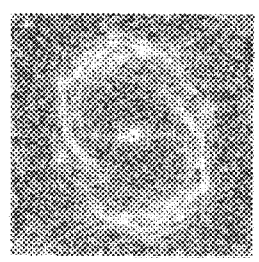
Figure 11H:
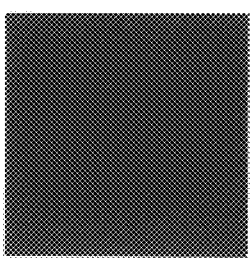
Figure 12:
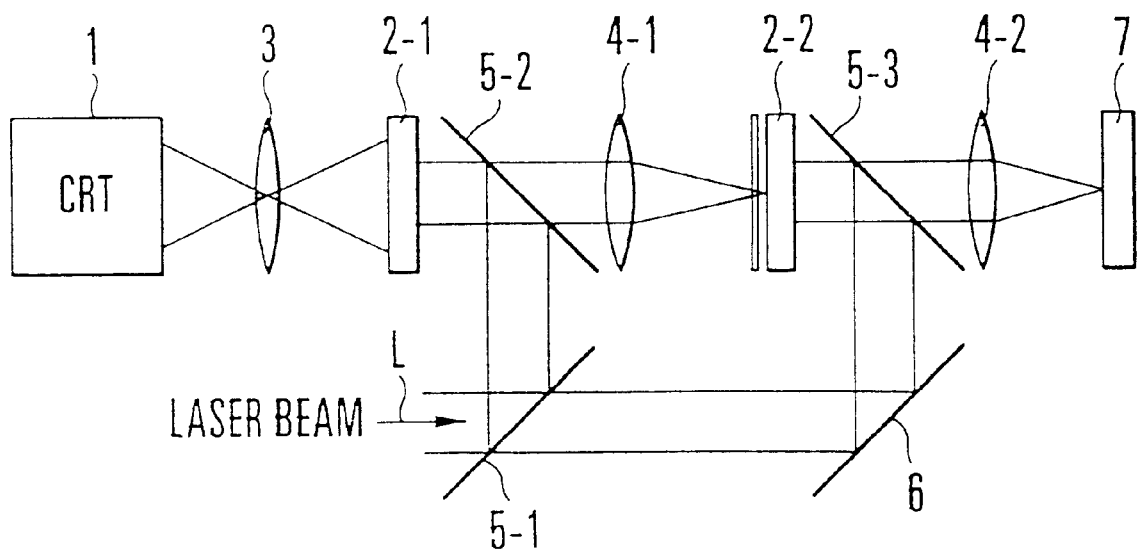
FIG. 12 is a view showing the experimental system of a conventional fingerprint collation system using phase modulation type liquid crystal spatial light modulators.
Figure 13A:
FIGS. 13A to 13C are views for explaining fingerprint collation processes in the conventional system shown in FIG. 12.
Figure 13B:
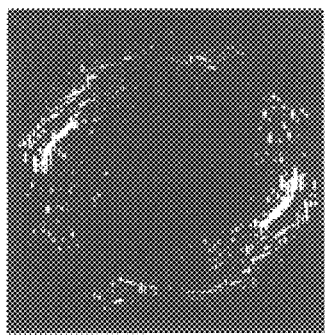
Figure 13C:
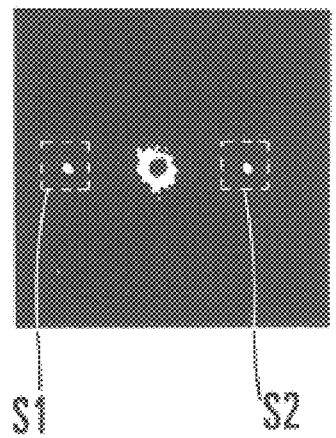

As shown in FIG. 10, the controller 20-1 comprises a registration data preparation unit 20*a*, a collation data preparation unit 20*b*, a first reduction processing unit 20*c*, a second reduction processing unit 20*d*, a data synthesizing unit 20*e*, an amplitude suppressing unit 20*f*, and a pattern collation unit 20*g*. The registration data preparation unit 20*a* performs two-dimensional DFT (two-dimensional Discrete Fourier Transform) of the image data of a registration pattern to prepare registration Fourier image data. The collation data preparation unit 20*b* performs two-dimensional DFT of the image data of a collation pattern to prepare collation Fourier image data. The first reduction processing unit 20*c* performs reduction processing of the registration Fourier image data prepared by the registration data preparation unit 20*a* and registered. The second reduction processing unit 20*d* performs reduction processing of the collation Fourier image data prepared by the collation data preparation unit 20*b*. The data synthesizing unit 20*e* synthesizes the registration Fourier image data output from the first reduction processing unit 20*c* and registered with the collation Fourier image data output from the second reduction processing unit 20*d*, thereby outputting synthesized Fourier image data. The amplitude suppressing unit 20*f* performs amplitude suppressing processing of the synthesized Fourier image data from the data synthesizing unit 20*e*. The pattern collation unit 20*g* collates the registration pattern with the collation pattern on the basis of the intensities of the correlation components of pixels in a correlation component area which appears in the synthesized Fourier image data output from the Fourier transform unit 20-7 after the Fourier transform unit 20-7 (image transform means) performs two-dimensional DFT of the synthesized Fourier image data from the amplitude suppressing unit 20*f*. Note that the registration data preparation unit 20*a* and the collation data preparation unit 20*b* perform two-dimensional DFT of the image data of the registration pattern and the collation pattern by using the Fourier transform unit 20-7.

The registration data preparation unit 20*a* and the collation data preparation unit 20*b* perform two-dimensional DFT to obtain spatial frequency components constituting the registration and collation patterns, thereby obtaining the amplitude and phase information of the image data. The amplitude suppressing unit 20*f* suppresses the amplitude information of the synthesized Fourier image data to obtain only the phase information. When the Fourier transform unit 20-7 performs two-dimensional DFT of the synthesized Fourier image data after amplitude suppressing processing, a Fourier image representing a correlation intensity is obtained.

Fingerprint Registration

Figure 3:
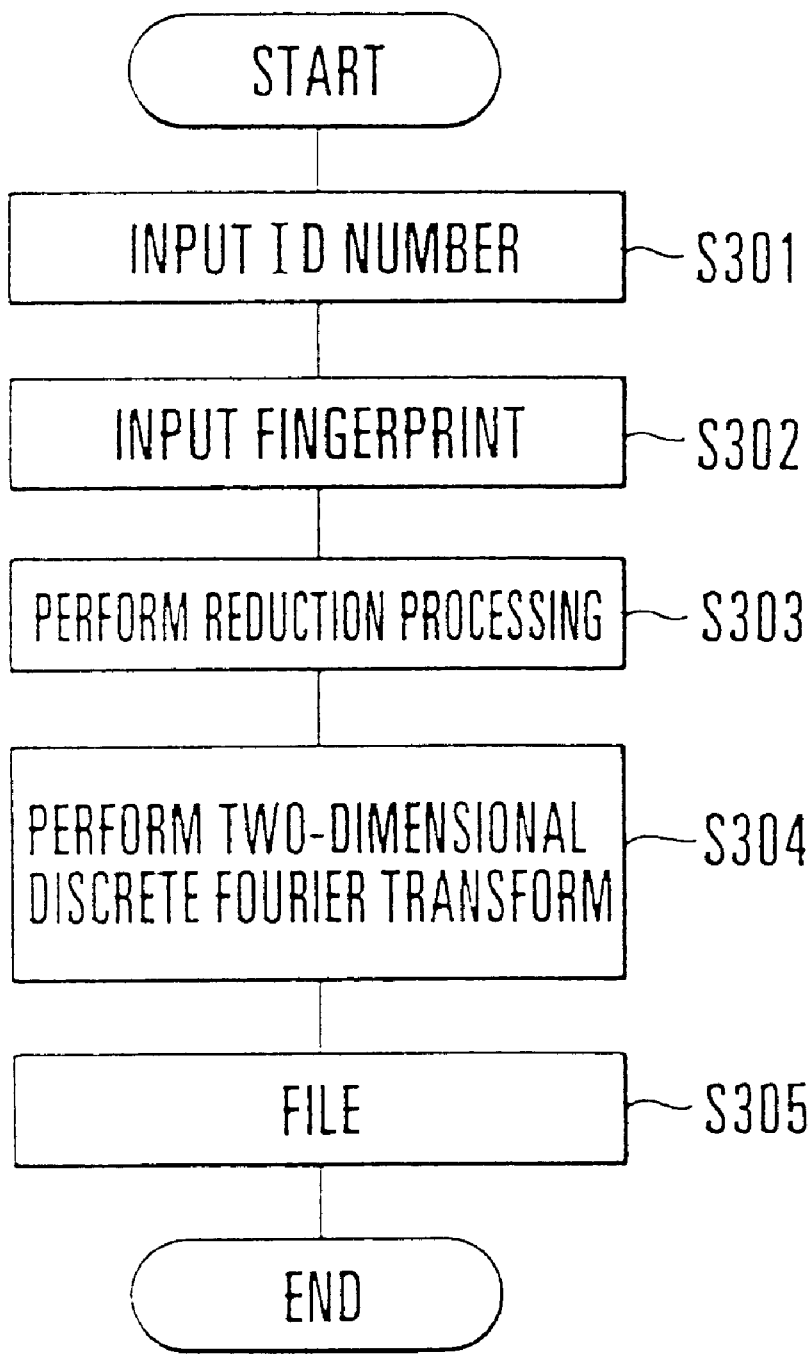
FIG. 3 is a flow chart for explaining the fingerprint registration operation of the fingerprint collation apparatus shown in FIG. 2.

The fingerprint registration operation of a user of this fingerprint collation apparatus will be described with reference to FIG. 3. Before the operation of the fingerprint collation apparatus, the user inputs an ID number of his/her own by using the ten-key pad 10-1 (step S301), and places a finger on the prism 10-32 of the fingerprint sensor 10-3. A light beam is irradiated from the light source 10-31 onto the prism 10-32. The light beam from the light source 10-31 is totally reflected at the recessed portions (valley portions) of the skin surface, which do not contact the surface of the prism 10-32, and reaches the CCD camera 10-33. Inversely, the total reflection condition does not apply to the projecting portions (ridge portions) of the skin surface, which contact the surface of the prism 10-32, thus scattering the light beam from the light source 10-31. Therefore, a fingerprint pattern with a contrast between the bright valley portions and the dark ridge portions of the skin surface can be picked up. This obtained fingerprint (registration fingerprint) pattern is A/D-converted by an A/D converter (A/D) 10-4 and supplied to the control unit 20 as gradation image (digital image data) consisting of 320×400 pixels in 256 gradation levels. The number of times of repetition of gradation changes represents a spatial frequency.

Figures 5A, 5B:
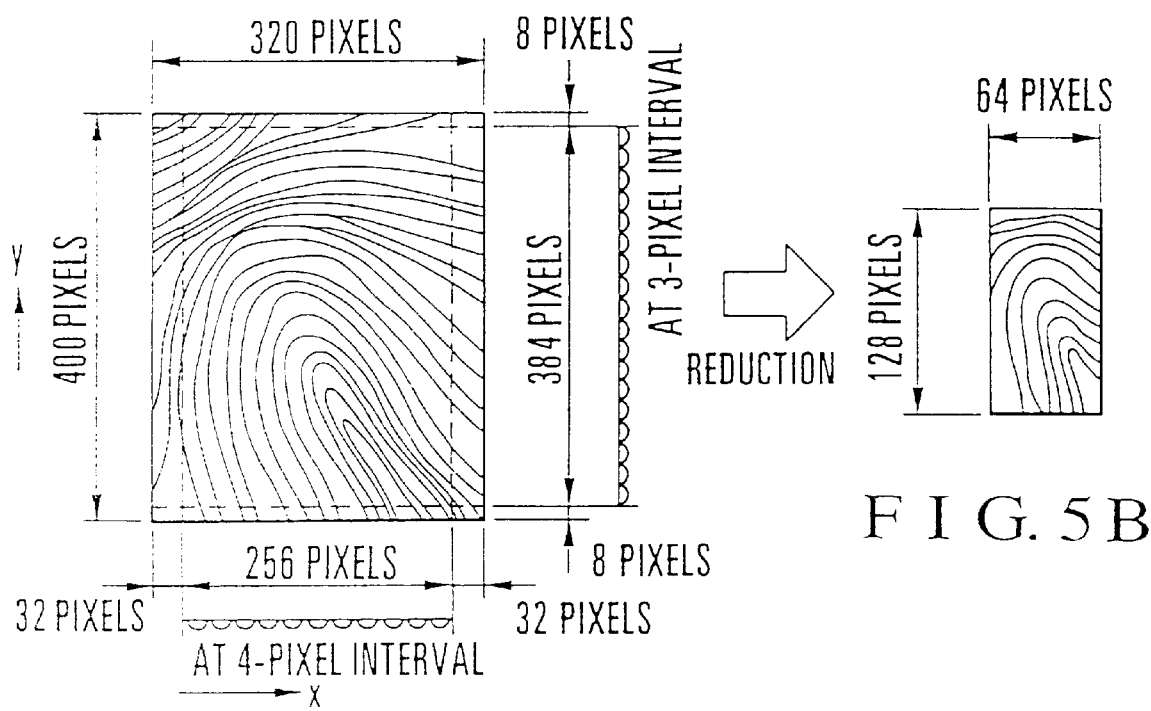
FIGS. 5A and 5B are explanatory views of image data before and after image data reduction processing.

The controller 20-1 fetches the registration fingerprint image data supplied from the operation unit through the frame memory 20-5 (step S302). The first reduction processing unit 20c performs reduction processing of the fetched registration fingerprint image data (step S303). This reduction processing is performed for the original image data consisting of 320×400 pixels in 256 gradation levels shown in FIG. 5A by thinning 32 pixels at both the left and right ends and skipping the pixels at a 4-pixel pitch along the X direction and thinning eight pixels at both the upper and lower ends and skipping the pixels at a 3-pixel pitch along the Y direction. With this processing, the registration fingerprint image data is reduced to image data consisting of 64×128 pixels in 256 gradation levels shown in FIG. 5B.

Figure 1A:
FIGS. 1A to 1H are views for explaining fingerprint collation processes in a fingerprint collation apparatus shown in FIG. 2.
Figure 1B:

The registration data preparation unit 20a of the controller 20-1 sends the reduced registration fingerprint image data shown in FIG. 1A to the Fourier transform unit 20-7 to perform two-dimensional DFT of the registration fingerprint image data (step S304). With this processing, the registration fingerprint image data shown in FIG. 1A becomes Fourier image data (registration Fourier image data) as shown in FIG. 1B. The controller 20-1 files this Fourier image data as original registration fingerprint image data in correspondence with the ID number input to the hard disk 20-4 (step S305). Two-dimensional discrete Fourier transform has been described in "Introduction to Computer Image Processing", Japan Industrial Technology Center, pp. 44–45, June 1990 (reference 2).

Fingerprint Collation

Figure 4:
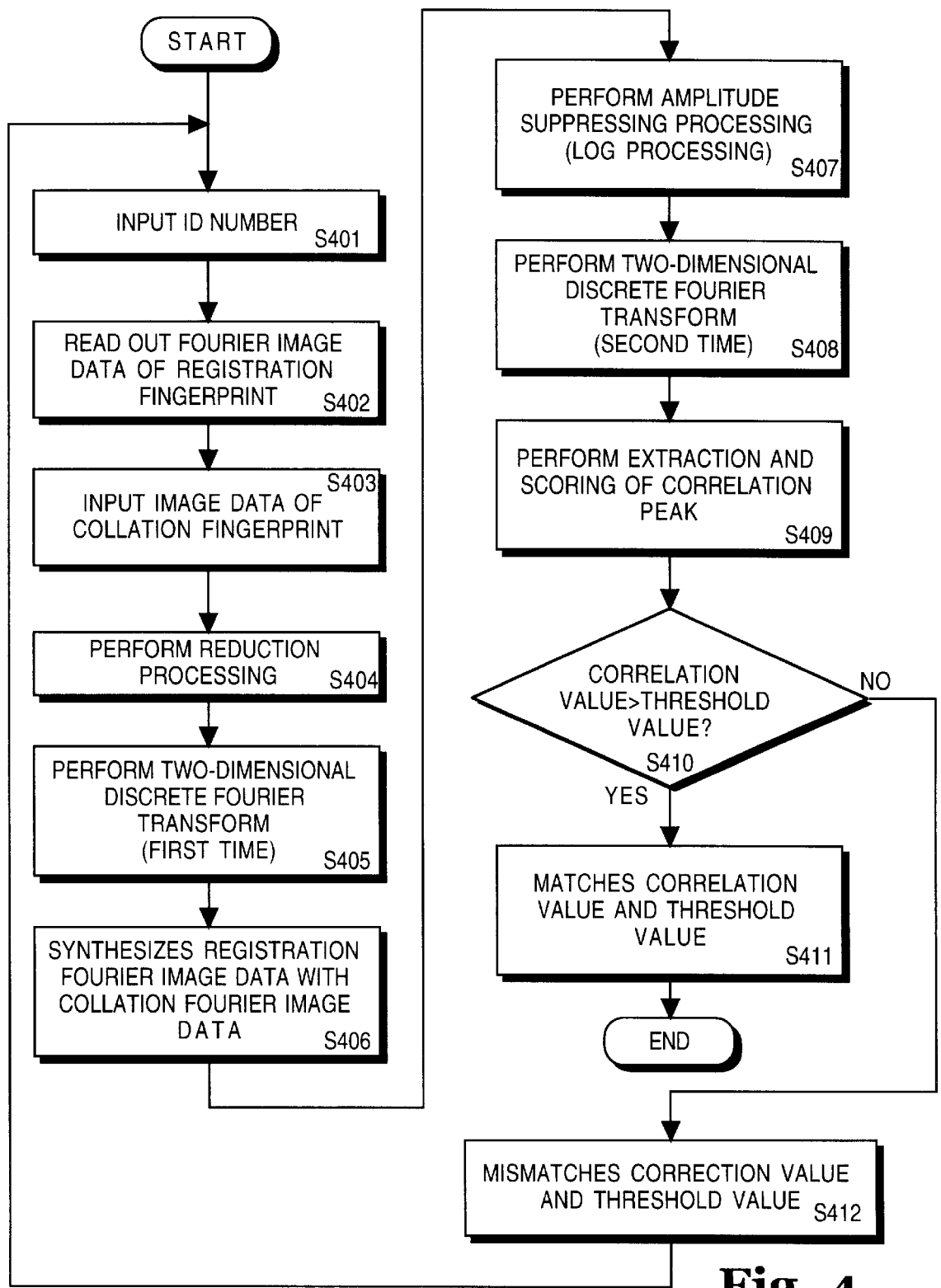
FIG. 4 is a flow chart for explaining the fingerprint collation operation of the fingerprint collation apparatus shown in FIG. 2.

The fingerprint collation operation of the user of this fingerprint collation apparatus will be described with reference to FIG. 4. During the operation of the fingerprint collation apparatus, the user inputs the ID number of his/her own by using the ten-key pad 10-1 (step S401) and places a finger on the prism 10-32 of the fingerprint sensor 10-3. As in the fingerprint registration operation, the fingerprint (collation fingerprint) pattern read by the CCD camera 10-33 is A/D-converted by the A/D converter (A/D) 10-4 and supplied to the control unit 20 as a gradation image (digital image data) consisting of 320×400 pixels in 256 gradation levels.

Upon reception of the ID number input through the ten-key pad 10-1, the controller 20-1 reads out the Fourier image data of a registration fingerprint corresponding to the ID number from registration fingerprints filed in the hard disk 20-4 (step S402).

Simultaneously, the controller 20-1 fetches the collation fingerprint image data supplied from the operation unit 10 through the frame memory 20-5 (step S403). The second reduction processing unit 20d performs reduction processing of the fetched collation fingerprint image data, as in step S303 (step S404). With this processing, the collation fingerprint image data is reduced to image data consisting of 64×128 pixels in 256 gradation levels.

Figure 1C:
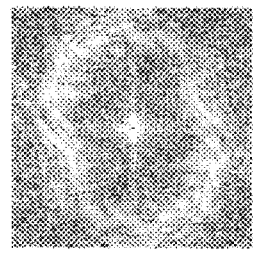
Figure 1D:
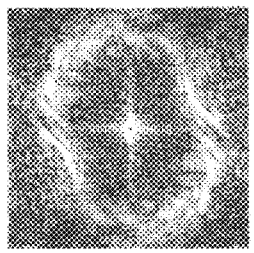
Figure 1E:
Figure 1F:
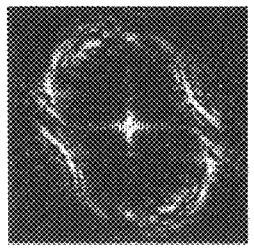

The collation data preparation unit 20b of the controller 20-1 sends the reduced collation fingerprint image data shown in FIG. 1E to the Fourier transform unit 20-7 to perform two-dimensional DFT of the collation fingerprint image data (step S405). With this processing, the collation fingerprint image data shown in FIG. 1E becomes Fourier image data (collation Fourier image data) as shown in FIG. 1F.

The data synthesizing unit 20e of the controller 20-1 synthesizes the collation fingerprint Fourier image data obtained in step S405 with the registration fingerprint Fourier image data read out in step S402 (step S406), thereby obtaining synthesized Fourier image data.

When the collation fingerprint Fourier image data is defined as $A \cdot e^{j\Phi}$, and the registration fingerprint Fourier image data is defined as $B \cdot e^{j\Phi}$, the synthesized Fourier image data is represented as $A \cdot B \cdot e^{j(\theta-\phi)}$ where A, B, θ, and φ are functions of frequency (Fourier) spaces (u and v). $A \cdot B \cdot e^{j(\theta-\phi)}$ is expressed as follows:

$$A \cdot B \cdot e^{j(\theta-\phi)} = A \cdot B \cdot \cos(\theta-\phi) + j \cdot A \cdot B \cdot \sin(\theta-\phi) \quad (1)$$

When $A \cdot e^{j\theta} = \alpha_1 + j\beta_1$, and $B \cdot e^{j\phi} = \alpha_2 + j\beta_2$, $A = (\alpha_1^2 + \beta_1^2)^{1/2}$ $B = (\alpha_2^2 + \beta_2^2)^{1/2}$ $\theta = \tan^{-1}(\beta_1/\alpha_1)$ $\theta = \tan^{-1}(\beta_2/\alpha_2)$ The synthesized Fourier image data is obtained by calculating equation (1).

Note that the synthesized Fourier image data may be obtained using equation (2):

$$\begin{aligned} A \cdot B \cdot e^{j(\theta-\phi)} &= A \cdot B \cdot e^{j\theta} \cdot e^{-j\theta} \\ &= A \cdot e^{j} \cdot B \cdot e^{-j\theta} \\ &= (\alpha_1 + j\beta_1) \cdot (\alpha_2 - j\beta_2) \\ &= (\alpha_1 \cdot \alpha_2 + \beta_1 \cdot \beta_2) + j(\alpha_2 \cdot \beta_1 - \alpha_1 \cdot \beta_2) \end{aligned} \quad (2)$$

After the synthesized Fourier image data is obtained, the controller 20-1 performs amplitude suppressing processing based on phase only correlation by using the amplitude suppressing unit 20f (step S407). In this embodiment, log processing is performed as amplitude suppressing processing. More specifically, the amplitude suppressing unit 20f calculates the log of $A \cdot B \cdot e^{j(\theta-\phi)}$ as the expression of the synthesized Fourier image data, i.e., $\log(A \cdot B) \cdot e^{j(\theta-\phi)}$, thereby suppressing the amplitude, i.e., $A \cdot B$ to $\log(A \cdot B)$ ($A \cdot B > \log(A \cdot B)$). FIG. 1D shows the synthesized Fourier image data after amplitude suppressing processing.

The above-described phase only correlation is crosscorrelation for correction, which is adjusted to give attention only to the spatial phase shift of an image, so that synthesized Fourier image data with only phase information is obtained by suppressing the amplitude information. For the synthesized Fourier image data after amplitude suppressing processing, the influence of an illuminance difference in sampling between the registration fingerprint and the collation fingerprint is minimized. More specifically, the spectrum intensity of each pixel is suppressed by amplitude suppressing processing. Therefore, excessively large values are removed so that a larger quantity of information can be effectively used. In addition, of the fingerprint information, characteristic points (end points and branch points) or characteristics (spirals and branches) of the ridge portions are emphasized, so that the flow and direction of the entire ridge portions as general fingerprint information are suppressed.

In this embodiment, log processing is performed as amplitude suppressing processing. However, $\sqrt{}$ processing may be performed. Processing is not limited to log processing or $\sqrt{}$ processing, and any other processing may be performed as far as the amplitude can be suppressed. When all amplitudes are suppressed to a constant value, e.g., 1 by amplitude suppressing processing, i.e., when only phase information is obtained, the calculation amount can be decreased, and the data amount can be decreased, as compared to log processing or $\sqrt{}$ processing.

Figure 1G:
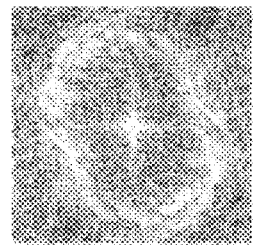
Figure 1H:
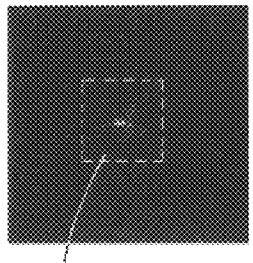

After amplitude suppressing processing is performed in step S407, the controller 20-1 sends the synthesized Fourier image data subjected to amplitude suppressing processing to the Fourier transform unit 20-7 serving as an image processing means to perform second-time two-dimensional DFT (step S408). With this processing, the synthesized Fourier image data shown in FIG. 1D becomes synthesized Fourier image data as shown in FIG. 1H.

The pattern collation unit 20g of the controller 20-1 fetches the synthesized Fourier image data obtained in step S408, scans the intensities (amplitudes) of the correlation components of pixels in a predetermined correlation component area of the synthesized Fourier image data, thereby obtaining the histogram of the intensities of the correlation components of the pixels. N higher-intensity pixels (eight pixels in this embodiment) of correlation components are extracted from this histogram. The average value of the intensities of the correlation components (correlation peaks) of the extracted N pixels is obtained as a correlation value (score) (step S409). The correlation component area is defined as an area S0 surrounded by a white dot line in the synthesized Fourier image data shown in FIG. 1H. FIG. 6 shows an example of the numerical data of the intensities of the correlation components of pixels in part of the correlation component area S0. Referring to FIG. 6, encircled numerical values represent the intensities of correlation components corresponding to the eight higher-intensity pixels.

The pattern collation unit 20g of the controller 20-1 compares the correlation value obtained in step S409 with a predetermined threshold value (step S410). If the correlation value is larger than the threshold value, it is determined that the registration fingerprint matches the collation fingerprint (step S411). This determination result is displayed, and an output for instructing to release the electrical lock is sent. If the correlation value is smaller than the threshold value, it is determined that the registration fingerprint does not match the collation fingerprint (step S412). This determination result is displayed, and the flow returns to step S401.

Figure 7:
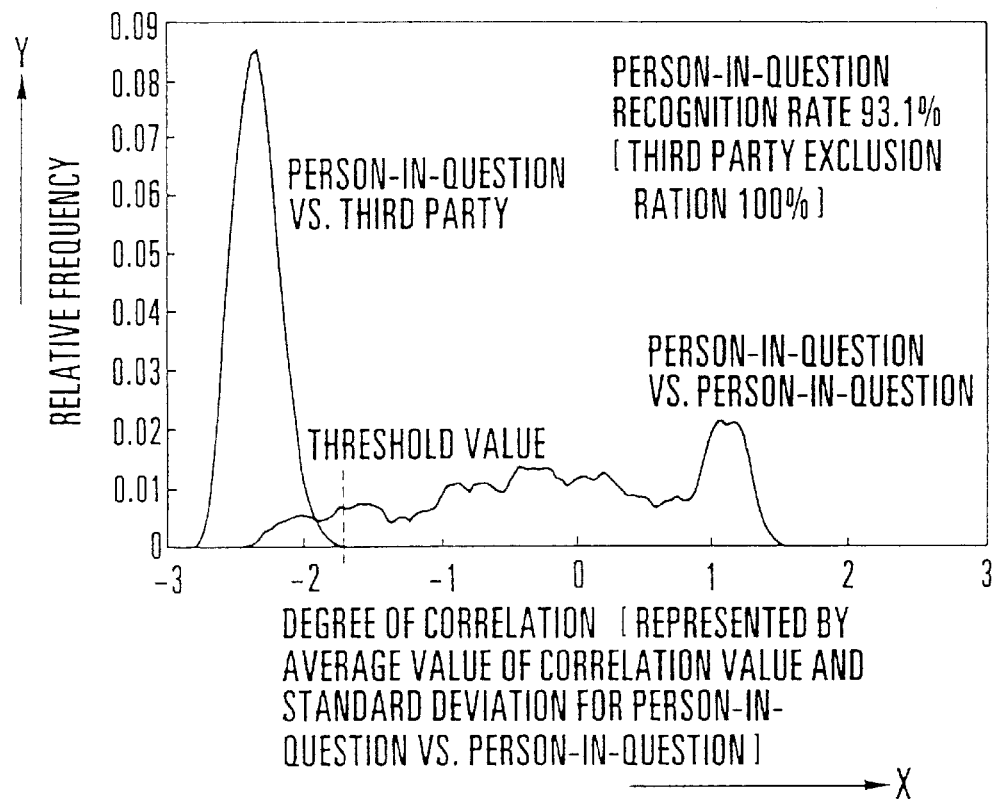
FIG. 7 is a graph showing the relative frequency distributions of correlation values for person-in-question vs. person-in-question and for person-in-question vs. third party, which have been obtained from experiments.

The threshold value as a reference value compared with the correlation value is obtained from the collation results of 10,000 collation operations for a total of 100 fingers used for registration and collation, i.e., the fingerprints of the first fingers of ten men and women in twenties to fifties as samples each of which is input ten times. FIG. 7 shows the relative frequency distributions of correlation values for person-in-question vs. person-in-question and for person-in-question vs. third party. The degree of correlation represented by an average value $\mu$ of correlation values and a standard deviation $\sigma$ in the combination of person-in-question vs. person-in-question is plotted along the X-axis, and the relative frequency is plotted along the Y-axis. The correlation value at which the third party exclusion ratio becomes 100% is used as a threshold value. Note that the third party exclusion ratio need not always be 100% and can be set at an arbitrary value in accordance with a purpose.

Figure 8:
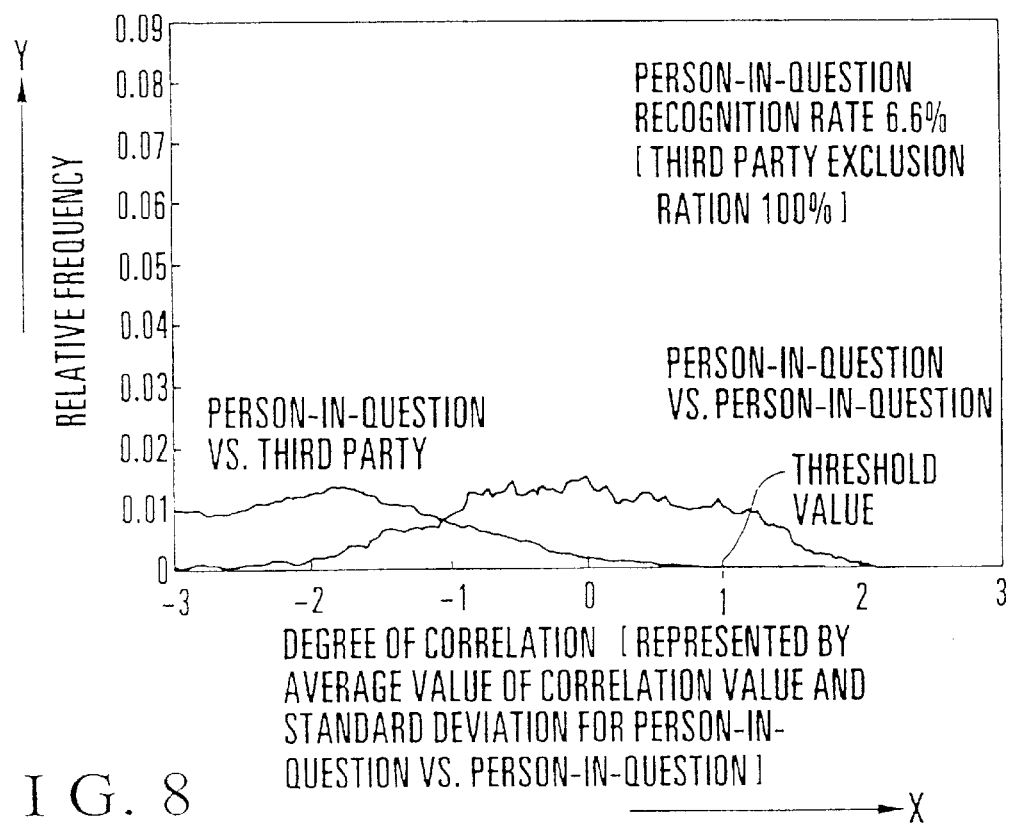
FIG. 8 is a graph showing the relative frequency distributions of correlation values for person-in-question vs. person-in-question and for person-in-question vs. third party, which are observed when no amplitude suppressing processing is performed.

FIG. 8 shows the relative frequency distributions of correlation values for person-in-question vs. person-in-question and for person-in-question vs. third party, without any amplitude suppressing processing. In this embodiment, amplitude suppressing processing is performed in step S407. Therefore, for the synthesized Fourier image data, the influence of the illuminance difference in sampling between the registration fingerprint and the collation fingerprint is minimized. In addition, of the fingerprint information, characteristic points (end points and branch points) or characteristics of ridge portions (spirals and branches) as personal information are emphasized, so that the collation accuracy is largely increased. More specifically, in FIG. 8, when the third party exclusion ratio is 100%, the person-in-question recognition rate is 6.6%. In FIG. 7, however, when the third party exclusion ratio is 100%, the person-in-question becomes 93.1%.

As described above, according to the fingerprint collation apparatus of this embodiment, two-dimensional DFT of collation fingerprint image data is performed to prepare collation Fourier image data. This collation Fourier image data is synthesized with registration Fourier image data which is prepared by similar processing. Amplitude suppressing processing is performed for the synthesized Fourier image data, and then two-dimensional DFT is performed. N higher-intensity pixels of correlation components are extracted from the correlation component area S0 which appears in the synthesized Fourier image data after two-dimensional DFT. The average value of the intensities of the correlation components of the extracted N pixels is obtained as a correlation value and compared with a predetermined threshold value, thereby collating the registration fingerprint with the collation fingerprint. With this processing, pixels with low intensities of correlation components are removed from pixels constituting the correlation component area S0, and fingerprint collation is performed. In addition, illuminance correction is performed by amplitude suppressing processing. For this reason, as compared to the conventional method in which optical Fourier transform is performed, the collation accuracy is largely increased.

Since only image processing of input image data is required, and neither phase modulation type liquid crystal spatial light modulator nor Fourier transform lens is needed, the cost can be decreased. In addition, the correlation component area S0 can be freely set using the image processing technique. If the widely set correlation component area S0 includes a common portion of the registration pattern and the collation pattern, highly accurate collation is possible even when the collation fingerprint has a positional shift. Furthermore, according to the fingerprint collation apparatus of this embodiment, two-dimensional DFT is performed for input image data to obtain the correlation value. Therefore, unlike an image processing technique in which characteristic points such as end points or branch points are extracted, processing is simplified, so that the speed of fingerprint collation accelerates. Furthermore, according to this embodiment, two-dimensional DFT of collation fingerprint image data and that of registration fingerprint image data are independently performed. For this reason, the registration fingerprint image data is processed, so the registration fingerprint image data can hardly be reproduced, i.e., restoration of the registration fingerprint image data becomes difficult. Therefore, illegal use of the registration fingerprint image data can be prevented.

In this embodiment, N higher-intensity pixels of correlation components are extracted from pixels in the correlation component area S0, and the average value of the intensities is obtained as a correlation value. However, a sum value of the intensities of the correlation components of the N higher-intensity pixels may be used as a correlation value. Alternatively, the intensities of the correlation components of all pixels higher than the threshold value may be added, and the sum value may be used as a correlation value, or the average value of the sum values may be used as a correlation value. Various determination methods are available: if any one of the intensities of the correlation components of pixels exceeds the threshold value, matching may be determined, or if N or more pixels exceed the threshold value, matching may be determined.

In this embodiment, two-dimensional DFT is performed by the Fourier transform unit 20-7. However, two-dimensional DFT may be performed by controller 20-1. In this embodiment, reduction processing of the registration fingerprint image data is performed in step S303. However, reduction processing may be performed after the registration fingerprint Fourier image data is read out (between steps S402 and S403). In addition, for registration fingerprint or collation fingerprint image data, reduction processing need not always be performed. Input image data at the time of registration or collation may be used without any processing to prepare Fourier image data. The reason why reduction processing is performed is that the capacity of the image memory used in processing of input image data can be decreased.

In this embodiment, two-dimensional DFT is performed in step S408. Instead of two-dimensional DFT, two-dimensional IDFT (two-dimensional Inverse Discrete Fourier Transform) may be performed. More specifically, instead of performing two-dimensional DFT of synthesized Fourier image data after amplitude suppressing processing, two-dimensional IDFT may be performed. The collation accuracy does not quantitatively change between two-dimensional DFT and two-dimensional IDFT. Two-dimensional IDFT has been described in reference 2.

Figure 9A:
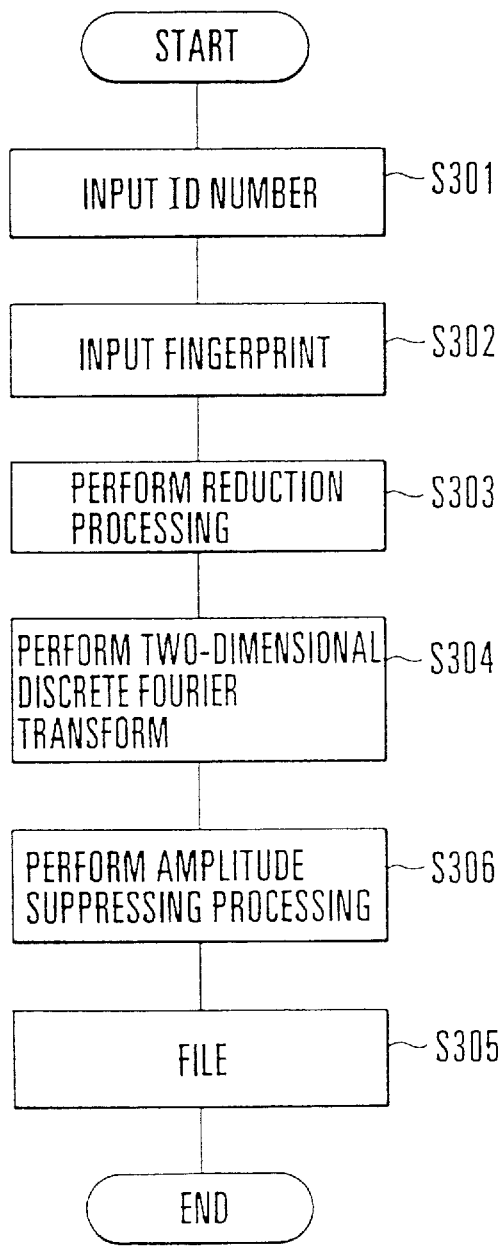
FIGS. 9A and 9B are flow charts for explaining another examples of the fingerprint registration operation and fingerprint collation operation of the fingerprint collation apparatus shown in FIG. 2.
Figure 9B:
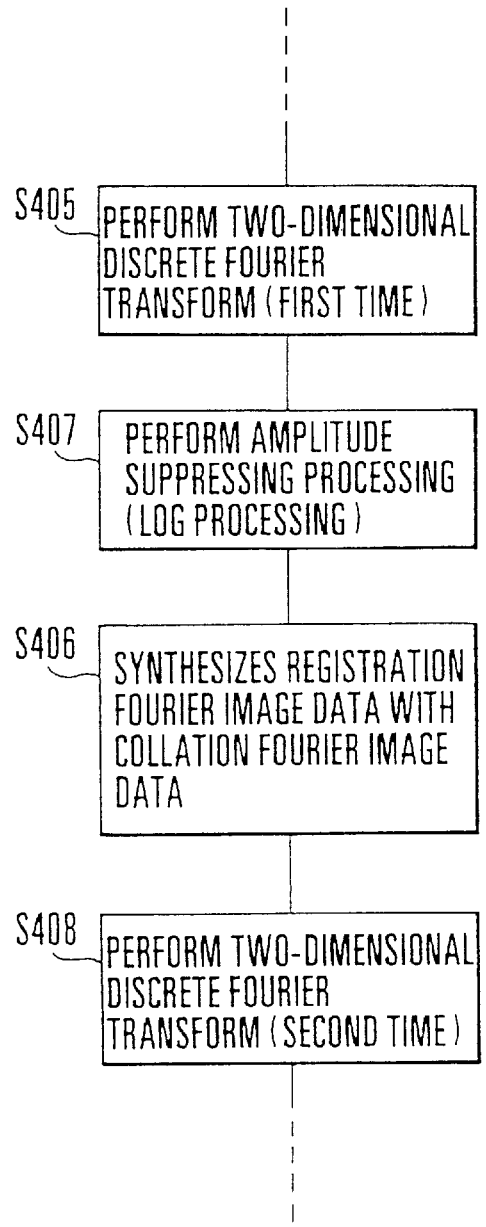

In this embodiment, amplitude suppressing processing is performed for Fourier image data after synthesis (steps S406 and S407). However, registration fingerprint Fourier image data and collation fingerprint Fourier image data before synthesis may be subjected to amplitude suppressing processing by first and second processing units 20f1 and 20f2 shown in FIG. 10, and thereafter the image data may be synthesized. More specifically, as shown in FIG. 9A, step S306 may be inserted between steps S304 and S305 in FIG. 3, and steps S406 and S407 in FIG. 4 may be reversed, as shown in FIG. 9B.

In this case, by amplitude suppressing processing in step S306, registration fingerprint Fourier image data (registration Fourier image data) after amplitude suppressing processing shown in FIG. 1C is obtained. By inverting steps S406 and S407, collation fingerprint Fourier image data (collation Fourier image data) after amplitude suppressing processing shown in FIG. 1G is obtained. The registration fingerprint and collation fingerprint Fourier image data after amplitude suppressing processing are synthesized to obtain synthesized Fourier image data as shown in FIG. 1D. The amplitude suppressing ratio of the synthesized Fourier image data at this time is smaller than that in amplitude suppressing processing of synthesized Fourier image data, as shown in FIG. 4. Therefore, when amplitude suppressing processing is performed after synthesized Fourier image data is obtained, as shown in FIG. 4, the collation accuracy increases as compared with obtaining synthesized Fourier image data after amplitude suppressing processing, is performed as shown in FIG. 9B. When Fourier image data is to be synthesized after amplitude suppressing processing shown in FIG. 9B is performed, two-dimensional IDFT may be performed for the synthesized Fourier image data instead of two-dimensional DFT.

As a reference, FIGS. 11A to 11H show images in fingerprint collation processes for the collation fingerprint of a third party in correspondence with FIGS. 1A to 1H. FIGS. 1A to 1H show images in fingerprint collation processes for the collation fingerprint of a person in question. For the collation fingerprint of the person in question, a portion with high intensities of correlation components is generated in the correlation component area S0. However, for the collation fingerprint of the third party, such a portion is not generated.

In this embodiment, fingerprint collation has been described. However, the present invention can also be applied to voice print collation and can also be used to collate various patterns (one-dimensional/two-dimensional/multidimensional) in addition to a fingerprint and voice print.

As has been described above, according to the present invention, on the basis of the intensities of correlation components of pixels in a correlation component area which appears in synthesized Fourier image data after two-dimensional DFT (two-dimensional IDFT), collation between a registration pattern and a collation pattern is performed. Therefore, the S/N ratio can be increased as compared to the conventional method in which optical Fourier transform is performed.

By performing amplitude suppressing processing, a deterioration in the collation accuracy caused by the illuminance difference between registration processing and collation processing can be prevented. More specifically, since amplitude information is suppressed, the influence of the illuminance difference between images, a positional shift, variations in gradation, a distortion, or an error of disconnection or connection in minute fingerprint details is minimized.

The correlation component area can be freely set by using an image processing technique. When the correlation component area is increased, the positional shift of a collation fingerprint can be easily coped with this arrangement. That is, the S/N ratio can be consistent with the problem of a positional shift.

Only image processing of input image data is required: A phase modulation type liquid crystal spatial light modulator, Fourier transform lens, and photodiode or a CCD replacing a photodiode are not needed. Therefore, the cost can be decreased by LSI.

Since no raw image data is registered, the image data of a registration pattern can hardly be restored, so that illegal use can be prevented.

When amplitude suppressing processing is performed for synthesized Fourier image data, the collation accuracy can be further increased as compared with obtaining synthesized Fourier image data after amplitude suppressing processing.

What is claimed is:

1. A pattern processing apparatus comprising:
   registration data preparation means for performing two-dimensional discrete Fourier transform of image data of a registration pattern to prepare registration Fourier image data including phase information and amplitude information;
   collation data preparation means for performing two-dimensional discrete Fourier transform of image data of a collation pattern to prepare collation Fourier image data including phase information and amplitude information;

data synthesizing means for synthesizing the registration Fourier image data prepared by said registration data preparation means with the collation Fourier image data prepared by said collation data preparation means to output first synthesized Fourier image data;

image processing means for performing Fourier transform of the first synthesized Fourier image data from said data synthesizing means to output second synthesized Fourier image data representing intensities of correlation components;

pattern collation means for collating said registration pattern with said collation pattern on the basis of the intensities of the correlation components of pixels in a correlation component area set in the second synthesized Fourier image data from said image processing means; and amplitude suppressing processing means for performing amplitude suppressing processing of one of the registration/collation Fourier image data and the first synthesized Fourier image data to extract only the phase information.

2. An apparatus according to claim 1, wherein said amplitude suppressing processing means performs amplitude suppressing processing of the first synthesized Fourier image data output from said synthesizing means, and said data synthesizing means synthesizes the registration Fourier image data with the collation Fourier image data, which have not been subjected to amplitude suppressing processing, to output the first synthesized Fourier image data to said amplitude suppressing processing means.

3. An apparatus according to claim 1, wherein said amplitude suppressing processing means comprises a first processing unit for performing amplitude suppressing processing of the registration Fourier image data prepared by said registration data preparation means, and a second processing unit for performing amplitude suppressing processing of the collation Fourier image data prepared by said collation data preparation means, and said data synthesizing means synthesizes the registration Fourier image data with the collation Fourier image data, which have been subjected to amplitude suppressing processing by said first and second processing units, to output the first synthesized Fourier image data.

4. An apparatus according to claim 1, wherein said image processing means performs two-dimensional discrete Fourier transform as Fourier transform.

5. An apparatus according to claim 1, wherein said image processing means performs two-dimensional inverse discrete Fourier transform as Fourier transform.

6. An apparatus according to claim 1, further comprising first reduction processing means for performing reduction processing of the image data of said registration pattern, and second reduction processing means for performing reduction processing of the image data of said collation pattern, and wherein said registration data preparation means and said collation data preparation means perform two-dimensional discrete Fourier transforms of the image data of said registration pattern and said collation pattern after reduction processing, respectively.

7. An apparatus according to claim 1, further comprising memory means for storing the registration Fourier image data prepared by said registration data preparation means, and wherein, upon reception of the image data of said collation pattern, said synthesizing means synthesizes the collation Fourier image data prepared by said collation data preparation means with the registration Fourier image data read out from said memory means.

8. An apparatus according to claim 1, wherein said pattern collation means comprises extraction means for extracting a predetermined number of pixels from a predetermined correlation component area in the second synthesized Fourier image data in descending order of intensities of the correlation components, calculation means for calculating an average value of the intensities of the correlation components of said pixels extracted by said extraction means as a correlation value, and determination means for determining matching between said registration pattern and said collation pattern when the correlation value calculated by said calculation means is larger than a predetermined threshold value.

9. An apparatus according to claim 1, wherein said registration and collation patterns are registration and collation fingerprints.

10. A pattern processing method comprising the steps of:
preparing registration Fourier image data including phase information and amplitude information by performing two-dimensional discrete Fourier transform of image data of a registration pattern;

preparing collation Fourier image data including phase information and amplitude information by performing two-dimensional discrete Fourier transform of image data of a collation pattern;

performing amplitude suppressing processing of the registration and collation Fourier image data if the amplitude of the registration and collation Fourier image data is to be suppressed;

outputting first synthesized Fourier image data by synthesizing the registration Fourier image data with the collation Fourier image data;

performing amplitude suppressing processing of the first synthesized Fourier image data if the amplitude of the first synthesized Fourier image data is to be suppressed;

outputting second synthesized Fourier image data representing correlation intensities by performing Fourier transform of the first synthesized Fourier image data;

performing pattern collation between said registration pattern and said collation pattern on the basis of intensities of correlation components of pixels in a correlation component area set in the second synthesized Fourier data.

11. A method according to claim 10, wherein the step of performing amplitude suppressing processing comprises the step of performing amplitude suppressing processing of the first synthesized Fourier image data, and the step of outputting the first synthesized Fourier image data comprises the step of synthesizing the registration Fourier image data with the collation Fourier image data, which have not been subjected to amplitude suppressing processing, to output the first synthesized Fourier image data.

12. A method according to claim 10, wherein the step of performing amplitude suppressing processing comprises the step of performing amplitude suppressing processing of the registration Fourier image data and the step of performing amplitude suppressing processing of the collation Fourier image data, and the step of outputting the first synthesized Fourier image data comprises the step of synthesizing the registration Fourier image data with the collation Fourier image data, which have been subjected to amplitude suppressing processing, to output the first synthesized Fourier image data.

13. A method according to claim 10, wherein the step of outputting the second synthesized Fourier image data comprises the step of performing two-dimensional discrete Fourier transform as Fourier transform.

14. A method according to claim 10, wherein the step of outputting the second synthesized Fourier image data comprises the step of performing two-dimensional inverse discrete Fourier transform as Fourier transform.

15. A method according to claim 10, further comprising the step of performing reduction processing of the image data of said registration pattern, and the step of performing reduction processing of the image data of said collation pattern, and wherein the steps of preparing the registration Fourier image data and the collation Fourier image data comprise the step of performing two-dimensional discrete Fourier transform of the image data of said registration pattern and said collation pattern after reduction processing.

16. A method according to claim 10, further comprising the step of storing the registration Fourier image data and the step of reading out the registration Fourier image data upon reception of the image data of said collation pattern, and wherein the step of outputting the first synthesized Fourier image data comprises the step of synthesizing the input collation Fourier image data with the readout registration Fourier image data.

17. A method according to claim 10, wherein the step of performing pattern collation comprises the steps of extracting a predetermined number of pixels from a predetermined correlation component area in the second synthesized Fourier image data in descending order of intensities of the correlation components, calculating an average value of the intensities of the correlation components of said extracted pixels as a correlation value, and determining matching between said registration pattern and said collation pattern when the calculated correlation value is larger than a predetermined threshold value.

18. A method according to claim 10, wherein said registration and collation patterns are registration and collation fingerprints.

* * * * *

UNITED STATES PATENT AND TRADEMARK OFFICE
CERTIFICATE OF CORRECTION

PATENT NO. : 5,915,034
DATED : June 22, 1999
INVENTOR(S) : Nakajima et al.

It is certified that error appears in the above-identified patent and that said Letters Patent is hereby corrected as shown below:

Column 5,
Line 45, delete "June 1990" and insert -- June, 1990 --.

Column 12,
Line 43, delete "Fourier data." and insert -- Fourier data; and performing amplitude suppressing processing of one of the registration/collation Fourier image data and the first synthesized Fourier Image data.--.

Signed and Sealed this

Fourteenth Day of August, 2001

*Attest:*

NICHOLAS P. GODICI
*Attesting Officer*     Acting Director of the United States Patent and Trademark Office